Patented Dec. 19, 1933

1,940,059

UNITED STATES PATENT OFFICE 1,940,059

WATERINSOLUBLE AZODYESTUFF

Friedrich Muth, Leverkusen-I. G., Werk, Germany, assignor to General Aniline Works, Inc., New York, N. Y., a corporation of Delaware No Drawing. Application April 4, 1932, Serial No. 603,207, and in Germany April 18, 1931

4 Claims. (Cl. 260—86)

The present invention relates to waterinsoluble azodyestuffs, more particularly it relates to dyestuffs which may be represented by the probable general formula:

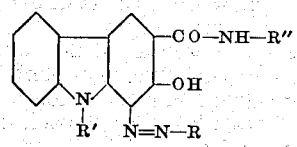

wherein "R" stands for the radical of a diazotized primary amine suitable for producing an azodyestuff, such as for a radical of an aminobenzene, amino-naphthalene, aminocarbazole, aminoanthraquinone, aminofluorenone, "R'" stands for alkyl or for a hydrocarbon radical of the aromatic or aromatic-aliphatic series and "R''" stands for an aromatic or heterocyclic nucleus, for example, for a benzene, naphthalene, indole, carbazole, diphenyleneoxide, fluorene or fluorenone nucleus, and wherein all nuclei may be substituted by one or more monovalent substituents, such as halogen, the nitro group, an alkyl group, an alkoxy group, an aryloxy group and an acylamino group, but with the exception of a group inducing solubility in water, such as the sulfonic acid group, the carboxylic acid group or a further hydroxy group.

My dyestuffs are obtainable according to known methods by diazotizing in the usual manner any primary amine suitable for producing an azodyestuff and coupling with a hydroxycarbazole carboxylic acid arylamide of the general formula:

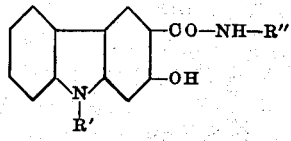

wherein the figures "R'" and "R''" means the same as stated above, thereby the components being selected in such a manner that apart from the hydroxy group present in the coupling component none contains a group inducing solubility in water.

The coupling can be performed in substance, on a substratum or on the fibre, especially the cellulosic fibre. Dyestuffs of various shades are thus obtained, which when produced on the fibre according to the known method of producing ice colors, show good fastness properties.

The hydroxycarbazole carboxylic acid arylamides used as coupling components in the manufacture of my dyestuffs have been described and claimed in my co-pending application Serial No. 603,208, filed April 4, 1932 entitled "New hydroxycarbazole carboxylic acid arylamides".

The invention is illustrated by the following examples, but is not restricted thereto:

Example 1.—1.5 kgs. of 9-methyl-2-hydroxycarbazole-3-carboxylic acid-p-chloranilide (obtained after recrystallization from pyridine in small needles of the melting point 276° C.) are dissolved in 5 times the quantity of alcohol, twice the quantity of water and 0.5 times the quantity of a 35% aqueous caustic soda lye. The solution is introduced into 1000 litres of water containing besides caustic soda lye a protective colloid and a wetting agent.

In this solution 50 kgs. of cotton are impregnated for half an hour, squeezed off and developed in a bath containing 1.65 kgs. of diazotized m-chloraniline. After half an hour the cotton is rinsed, soaped while still hot and dried. A deep brown is obtained.

In an analogous manner the following shades can be obtained:

Diazo bath from:

4-nitraniline_____ A reddish-brown
6-chloro-2-toluidine_____ A reddish-deep brown
5-nitro-2-anisidine_____ A corinth m-amino-azotoluene of the formula:

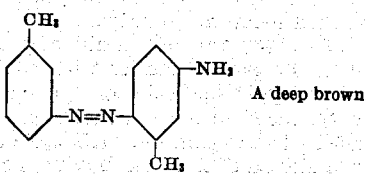

A deep brown.

1 - amino - 4 - benzoylamino -
  2.5-diethoxybenzene_____ A clear bluish violet
5-nitro-3-toluidine_____ Reddish-brown
4-amino-2.5-dimethoxy-4'-
  nitro-1.1'-azobenzene_____ Reddish-blue-black From the 9-methyl-2-hydroxycarbazole-3-carboxylic acid-o-anisidide the following shades can be obtained:

Diazo bath from:
3-chloraniline_____ A yellowish deep brown
3-nitraniline_____ A deep brown
1-methyl - 2 - amino-4-
  chlorobenzene_____ A reddish-brown
o-aminoazotoluene of the formula:

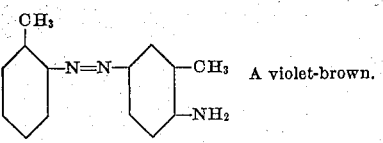  A violet-brown.

4-amino - 2.5 - dimethoxy-4'-nitro-
  1.1'-azobenzene_____ A dark blue

From the 9 - ethyl-2-hydroxycarbazole-3-carboxylic acid-o-toluidide (obtained after recrystallization from toluene in the form of cubes of the melting point 187° C.) the following shades can be obtained:

Diazo bath from:
3-chloraniline_____ A yellowish dark brown
2.5-dichloraniline_____ A deep brown
4-nitraniline_____ A reddish-brown
1 - methyl-2-amino - 4 -
  chlorobenzene_____ A yellowish dark brown
1 - amino -2.5-diethoxy-
  4 - benzoylaminoben-
  zene_____ A violet From the 9-methyl-2-hydroxycarbazole-3-carboxylic acid-anilide the following shades can be obtained:

Diazo bath from:
2.5-dichloraniline_____ A deep brown
1 - methyl-2-amino-6-chloro -
  benzene_____ A deep brown
1 - methyl - 2 - amino-5-nitro-
  benzene_____ A corinth
1 - amino-2.5-diethoxy-4-ben-
  zoylaminobenzene_____ A violet
1 - methyl-2-amino-4-chloro -
  benzene_____ A reddish-brown From the 9-methyl-2-hydroxycarbazole-3-carboxylic acid-o-toluidide (obtained after recrystallization from toluene in the form of yellow sticks of the melting point 193° C.) the following shades can be obtained:

Diazo bath from:
3-nitraniline_____ A dark yellowish-brown
4-nitraniline_____ A dark reddish-brown Similar but deeper shades are obtained when substituting in the above combinations the 9-methyl-2-hydroxycarbazole-3-carboxylic acid-o-toluidide by the 9-methyl-2-hydroxycarbazole-3-carboxylic acid-α-naphthylamide.

Example 2.—3.4 grams of 2-aminocarbazole are diazotized in the usual manner with sodium nitrite in hydrochloric acid solution. The diazo solution is introduced into a solution of 4 grams of 9-methyl-2-hydroxycarbazole carboxylic acid-2'-methoxyanilide, said solution having been prepared by dissolving the arylamide with the aid of 1.5 grams of caustic soda in 150 ccs. of water. By the addition of sodium bicarbonate the solution of the two components is rendered sodaalkaline and coupling is performed with the addition of an excess of sodium bicarbonate and of ice. The dyestuff formed is filtered with suction and dried. It is a brown powder. The dyestuff has the following formula:

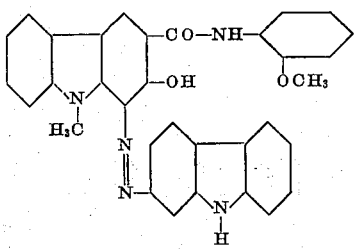

By substituting the 2-aminocarbazole by the 2-aminodiphenylenoxide there is obtained a dyestuff of the following formula:

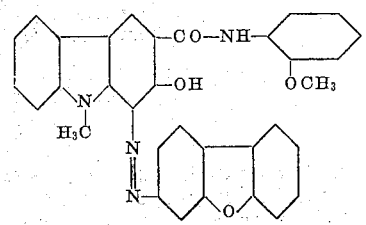

When producing these dyestuffs on the fibre, dark, violet shades of good fastness properties are obtained.

Example 3.—3, 4 grams of 2-aminocarbazole are diazotized in the usual manner. The diazo solution is introduced into a solution of 9-phenyl-2-hydroxycarbazole-3-carboxylic acid-2'-methylanilide, prepared by dissolving 4 grams of the arylamide in about 200 ccs. of alcoholic caustic soda containing 1.5 grams of caustic soda. Neutralization and coupling are performed as described in Example 2. After filtering and drying, the dyestuff of the formula:

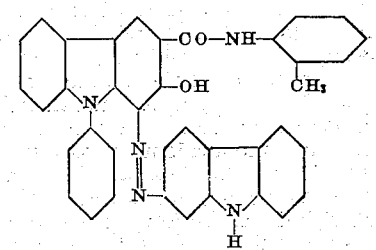

is obtained in form of a brown powder.

The dyestuff of the formula:

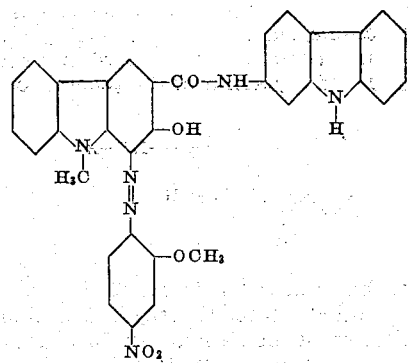

has similar properties.

When producing these dyestuffs on the fibre violet shades of good fastness properties are obtained.

I claim:
1. Azodyestuffs of the probable general formula:

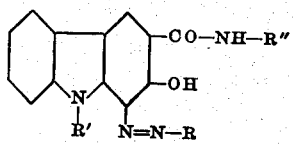

wherein "R" stands for the radical of a diazotized primary aromatic amine suitable for producing an azodyestuff, "R'" stands for alkyl or for an aromatic radical of the benzene- or naphthalene-series and "—NH—R''" stands for the radical of an aromatic primary amine of the benzene- or naphthalene series, or for the radical of a heterocyclic primary amine containing at least one phenyl nucleus, and wherein the nuclei may be substituted by substituents selected from the group consisting of halogen, the nitro group, an alkyl group, an alkoxy group, an aryloxy group and an acylamino group, yielding, when produced on the fibre, various shades of good fastness properties.

2. Azodyestuffs of the probable general formula:

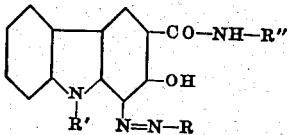

wherein "R" and "R''" stand for nuclei of the benzene or naphthalene series and "R'" stands for alkyl, and wherein the nuclei may be substituted by substituents selected from the group consisting of halogen, the nitro group, an alkyl group, an alkoxy group, an aryloxy group and an acylamino group, yielding, when produced on the fibre, various shades of good fastness properties.

3. Azodyestuffs of the probable general formula:

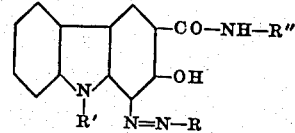

wherein "R" and "R''" stand for benzene nuclei which may be substituted by substituents selected from the group consisting of halogen, the nitro group an alkyl group, an alkoxy group, an aryloxy group and an acylamino group, and "R'" stands for methyl or ethyl, yielding, when produced on the fibre, generally violet to brown shades of good fastness properties.

4. The azodyestuff of the following formula:

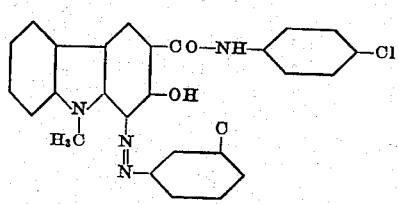

yielding, when produced on the fibre, brown shades of good fastness properties.

FRIEDRICH MUTH.